Feb. 25, 1964 — L. R. REEDER — 3,122,350
QUICK OPENING VALVE
Filed Oct. 26, 1960 — 5 Sheets-Sheet 1

INVENTOR.
LARRY R. REEDER
BY Morgan, Finnegan, Durham & Pine
ATTORNEYS

INVENTOR.
LARRY R. REEDER
BY
Morgan, Finnegan, Durham & Pine
ATTORNEYS

Feb. 25, 1964    L. R. REEDER    3,122,350
QUICK OPENING VALVE

Filed Oct. 26, 1960    5 Sheets-Sheet 3

INVENTOR.
LARRY R. REEDER
BY
Morgan, Finnegan, Durham & Pine
ATTORNEYS

Feb. 25, 1964 L. R. REEDER 3,122,350
QUICK OPENING VALVE
Filed Oct. 26, 1960 5 Sheets-Sheet 4

INVENTOR.
LARRY R. REEDER
BY
Morgan, Finnegan, Durham & Pine
ATTORNEYS

LARRY R. REEDER
INVENTOR.

United States Patent Office 3,122,350
Patented Feb. 25, 1964

1

3,122,350
QUICK OPENING VALVE
Larry R. Reeder, Menominee, Mich., assignor to Ansul Chemical Company, Marinette, Wis., a corporation of Wisconsin
Filed Oct. 26, 1960, Ser. No. 65,067
4 Claims. (Cl. 251—67)

This invention relates to a quick opening valve and more particularly is related to a valve means for use on a high pressure cylinder having novel means for permitting quick opening of the valve.

Although the valve of the present invention is particularly adapted for use with high pressure gas cylinders in single or multiple fire extinguisher installations, it is to be understood that the present invention is not limited to such embodiments. However, since the present invention is particularly useful in fire extinguisher installations, reference will be made hereinafter to fire extinguishers in order to provide an example of a practical and useful embodiment of the present invention.

It is customary for large dry chemical fire extinguishers to consist of two tanks, a low pressure tank containing the dry chemical extinguishing agent and a high pressure nitrogen cylinder. The dry chemical tank normally is not under pressure until the extinguisher is prepared for discharge. The nitrogen cylinder contains gas at a pressure exceeding 2000 pounds per square inch and when the extinguisher is to be discharged, the nitrogen cylinder valve is opened wide admitting the gas through the regulator to the dry chemical tank.

In the use of such fire extinguishers frequently the extinguishers are used individually and frequently are combined and connected together to form a plurality of fire extinguisher units which operate together. Whether such fire extinguishers are used individually or collectively, it is desirable for there to be means permitting the valve on the nitrogen cylinder to be opened a small amount or cracked to permit routine maintenance operations. The present invention, however, is directed toward novel means for permitting manual, quick opening of fire extinguisher valves and quick opening of fire extinguisher valves from a remote location which may be automatic in operation and may be used in conjunction with manually operated means for permitting slow opening and closing of the valve means.

In view of the foregoing, it is an object of the present invention to provide a valve means including novel operating means for permitting opening of the valve in different ways.

A further object of this invention is to provide a valve means including operating means wherein the valve may be operated locally or remotely.

Another object of the present invention is to provide a valve means for use in fire extinguishers including operating means wherein the valve may be quickly opened.

A further object of the present invention is to provide a valve means for use in fire extinguishers including operating means wherein the valve means may be opened quickly by a manual operation.

Still another object of the present invention is to provide a valve for use in fire extinguishers including operating means wherein the valve may be adapted to be automatically quickly opened.

A further object of the present invention is to provide a valve means including operating means wherein the valve may be adapted to be quickly opened by a manual or automatic operation.

A still further object of the present invention is a valve means including operating means wherein the valve means may be quickly opened by a manual or automatic operation and wherein the valve may be opened or closed slowly through a manual operation.

A still further object of the present invention is to provide a valve means having operating means wherein movement of the operating means in a plurality of directions will permit quick opening of the valve.

Still another object of the present invention is to provide a valve means having operating means wherein rotative movement of the operating means will permit quick opening of the valve.

A still further object of the present invention is to provide a valve means having operating means wherein axial movement of the operating means will permit quick opening of the valve.

A further object of the present invention is to provide a valve means having operating means wherein axial or rotative movement of the operating means will permit quick opening of the valve.

Additional objects and advantages of the invention will be set forth in the description which follows, and in part will be obvious from the description, or may be learned by practice of the invention, the objects and advantages being realized and attained by means of the instrumentalities and combinations particularly pointed out in the appended claims.

Briefly described, the present invention includes a valve body cooperating with an inlet. A stem is provided with a valve disk at one end for opening and closing the valve inlet. In accordance with this invention operating means are provided which cooperate with the other end of the valve stem to permit quick opening of the valve inlet in response to movement of the operating means. The present invention has several embodiments and in one embodiment rotative movement of the operating means opens the valve inlet while in another embodiment axial movement of the operating means opens the valve inlet.

The invention consists in the novel parts, constructions, arrangements, combinations and improvements shown and described.

It is to be understood that both the foregoing general description and the following detailed description are exemplary but are not restrictive of the invention.

Reference will now be made to the present preferred embodiment of the invention which is illustrated in the accompanying drawings.

Figures 1, 1A:
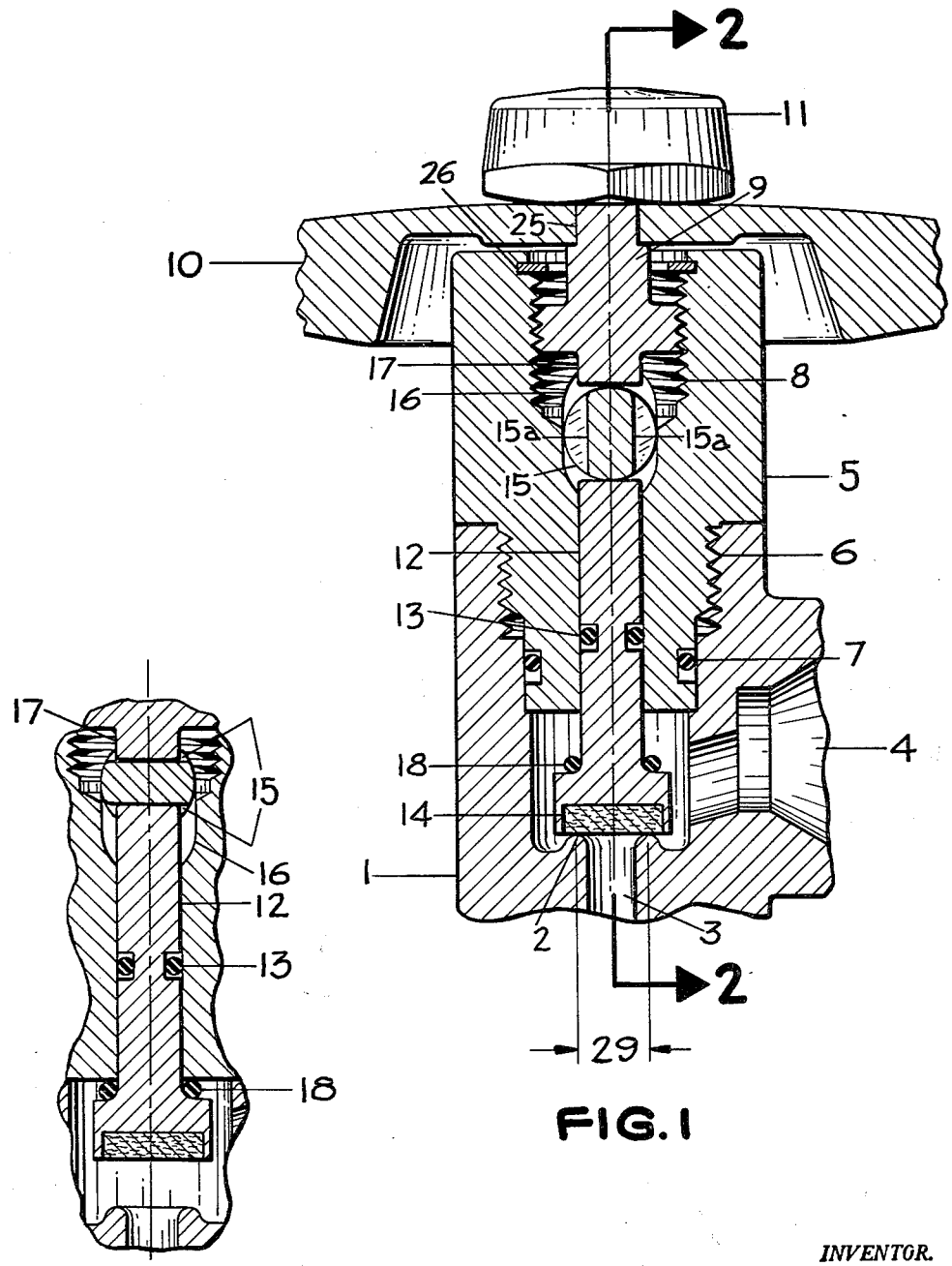
FIGURE 1 is a vertical sectional view showing the valve means of the present invention in a closed position.
FIGURE 1A is a partial view similar to FIGURE 1 showing the valve means of the present invention in an opened position.

In FIGURE 1 there is illustrated a valve means having a valve body 1 with a valve seat 2. The valve means is provided with an inlet passage 3 connected to a high pressure source e.g., a nitrogen cylinder, and a discharge passage 4. The valve body is threaded at 6 to receive the bonnet 5 and the joint between them is rendered pressure tight by the O ring 7.

The valve bonnet 5 includes an aperture or recess in which valve stem 12, having an O ring 13 to prevent the escape of gas along the stem when the valve is open, is slidably mounted. One end of the valve stem is provided with a resilient valve disk 14 which cooperates with the valve seat 2 in the usual and obvious manner.

The instant invention includes slow opening means having a handwheel 10 which is in engagement with a handwheel stem 9 by means of squared portion 25 on the stem 9 and the nut 11. The handwheel stem 9 is in threaded engagement with the threads 8 on the valve bonnet 5. For preventing accidental disengagement of the handwheel assembly from the valve bonnet a snap ring 26 is provided.

In accordance with this invention operating means are provided for permitting localized, manual quick opening of the valve means in response to rotative movement of the operating means.

As embodied herein, this means comprising a shaft 15 which is mounted in a recess 16 of the valve bonnet 5. The shaft 15 includes major and minor dimensions for permitting quick opening of the valve. As shown herein, FIGURES 1 and 1A, for purposes of illustration, the shaft 15 is provided with a plurality of circumferentially-spaced recess means 15A which form a plurality of faces having minor and major dimensions on the shaft 15.

The shaft 15 is provided at one end with an acorn shaped nut 27 and a handle 19 having an extension 28. The nut 27 and handle extension 28 cooperate to prevent accidental disassembly of the shaft 15 from the valve structure. The handle 19 is provided to rotate the shaft 15 in an obvious manner.

Figures 2, 2A:
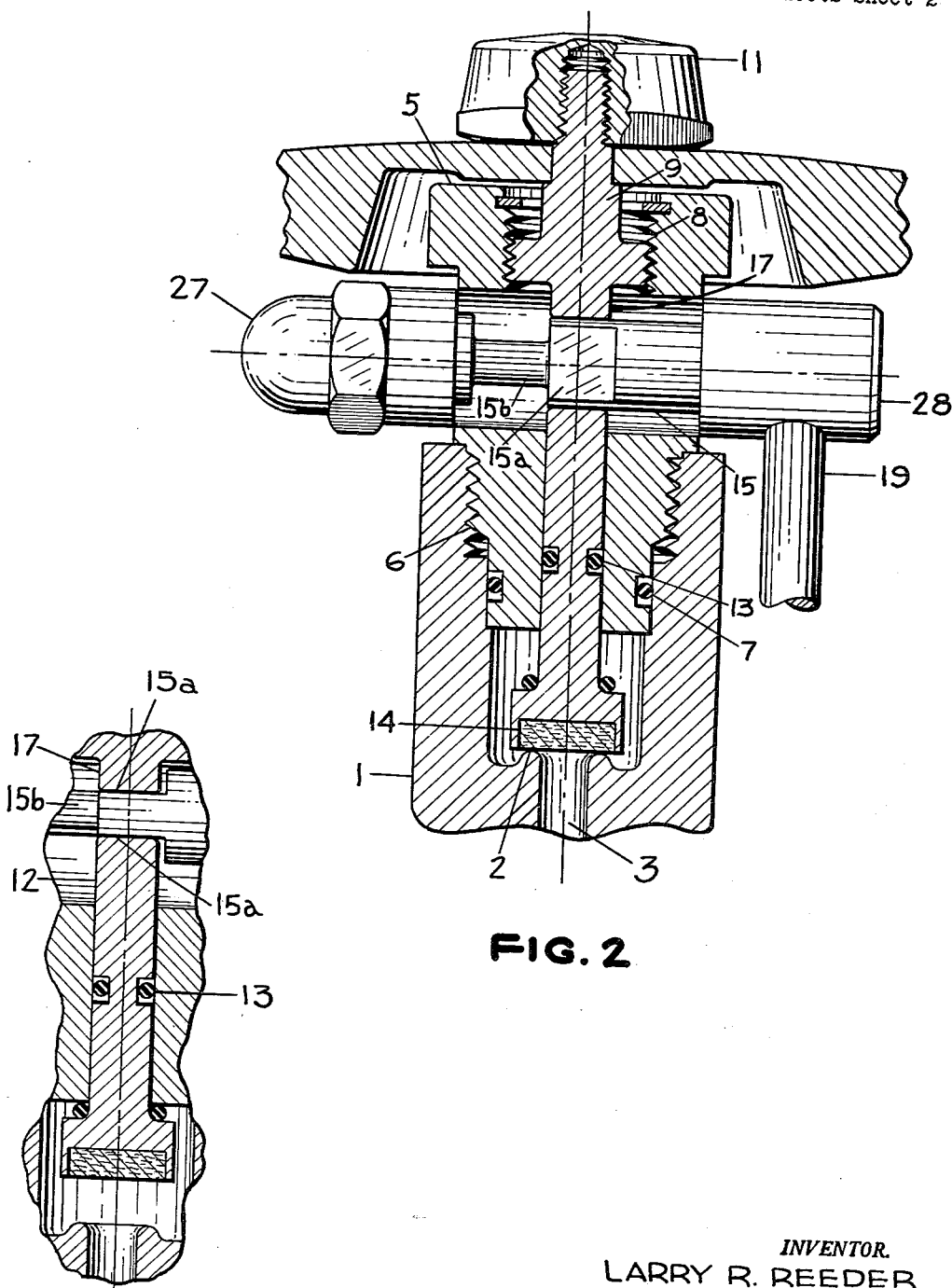
FIGURE 2 is a sectional view of FIGURE 1 taken along section line 2—2 of FIGURE 1.
FIGURE 2A is a partial view similar to FIGURE 2 showing the valve means in its open position.

For an understanding of the operation of this embodiment of the invention reference is now made to FIGURES 1 and 2 wherein the valve means is shown in the closed position. It is apparent that in this position the shaft 15 is engaged by the valve stem 12 and the handwheel stem or boss 17 to hold the valve disk 14 in closing engagement with the valve inlet 2.

When a conflagration or hazard develops, it is desirable that the inlet 3 be opened as quickly as possible in order to ensure rapid transmission of the fire extinguisher agent to the hazard. As shown in FIGURES 1A and 2A, when shaft 15 is rotated by handle 19, the recess 15A will be located adjacent the valve stem 12 and the handwheel stem 17. Since the valve disk 14 is under pressure the valve stem 12 will rise, engage the recess 15A, thereby causing the shaft 15 to rise until handwheel stem 17 engages the complementary recess 15A. The O ring 18 serves as a bumper which protects the valve disk from damage and injury.

It will be appreciated that when the valve means is in the closed position, the valve can be opened slowly by manual manipulation of the handwheel 10. Thus the handwheel can be rotated a small amount to permit shaft 15 and valve disk 14 to move upwardly in order to test or crack the valve means or the handwheel can be rotated as much as necessary to permit full operation of the device. The provision of the handwheel means provides a manual operable means which is simple in operation and not easily subjected to damage. The handwheel means also serves as a safety means, in effect, since it provides a means for opening the valve with which users are sure to be familiar. The handwheel structure also serves to take up the manufacturing tolerances and the wear and tear to which the device is subjected.

In accordance with another perferred embodiment of this invention means are provided for permitting remote and/or automatic operation of the valve means. More particularly, means are provided for quickly opening the valve means in response to axial or longitudinal movement of the shaft means.

Figure 3:
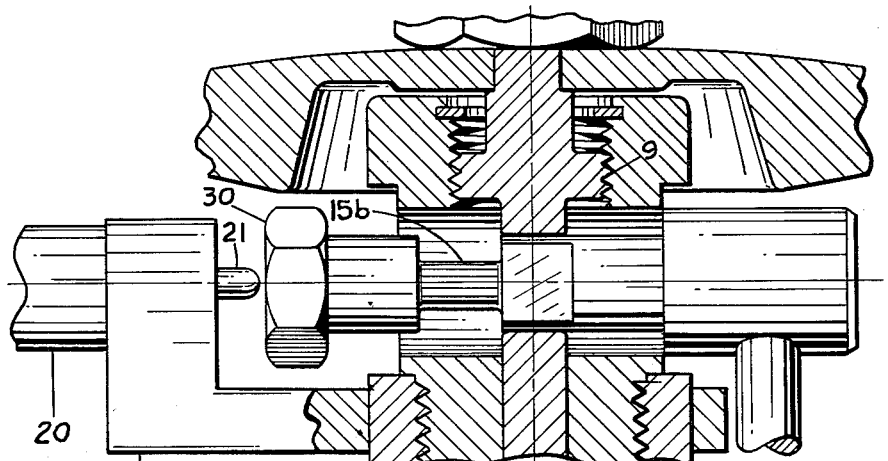
FIGURES 3 and 3A are sectional views showing another embodiment of the present invention with FIGURE 3 showing the valve means in its closed position and FIGURE 3A in its open position.
Figure 3A:
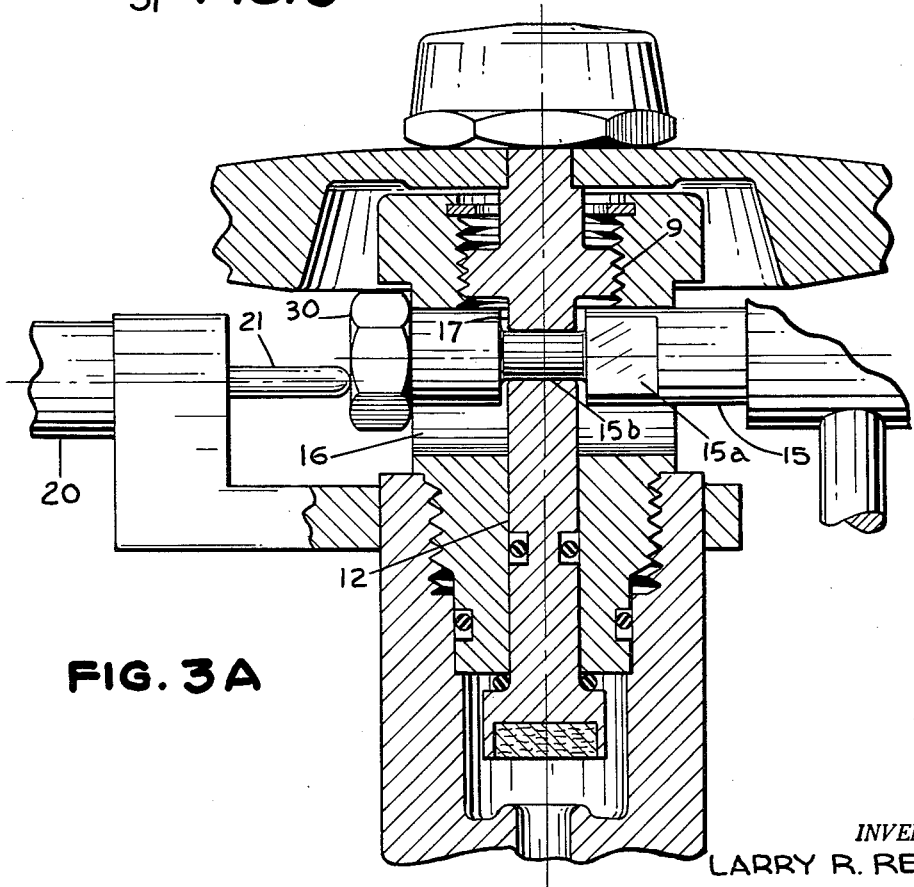

As embodied herein, FIGURES 3 and 3A, this means comprises an actuating device 20 having a plunger 21. It is contemplated that the actuating device 20 may be of any suitable type, i.e., electric, pneumatic, hydraulic or explosive. The actuating device may be mounted independently of the valve means or may be clamped by a conventional clamp as illustrated at 31.

Figure 5:
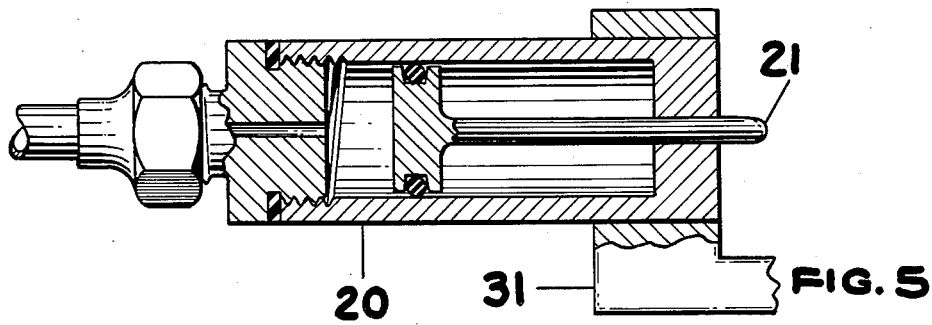
FIGURES 5-7 show several preferred embodiments of an actuating means usable with the FIGURES 3 and 3A embodiment.
Figure 6:
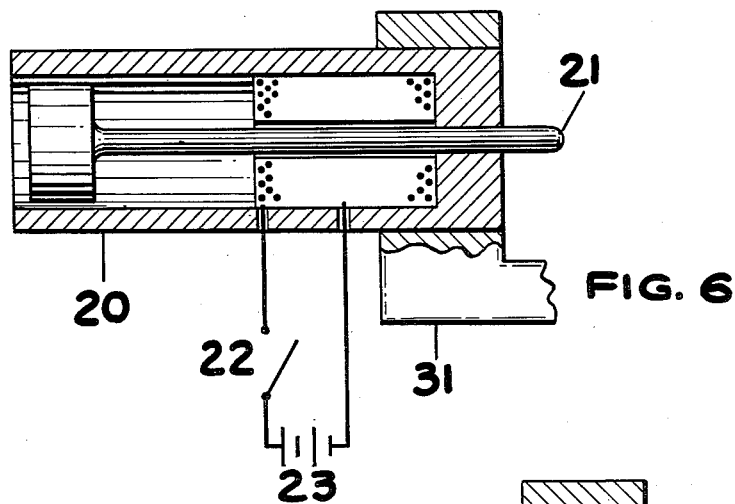
Figure 7:
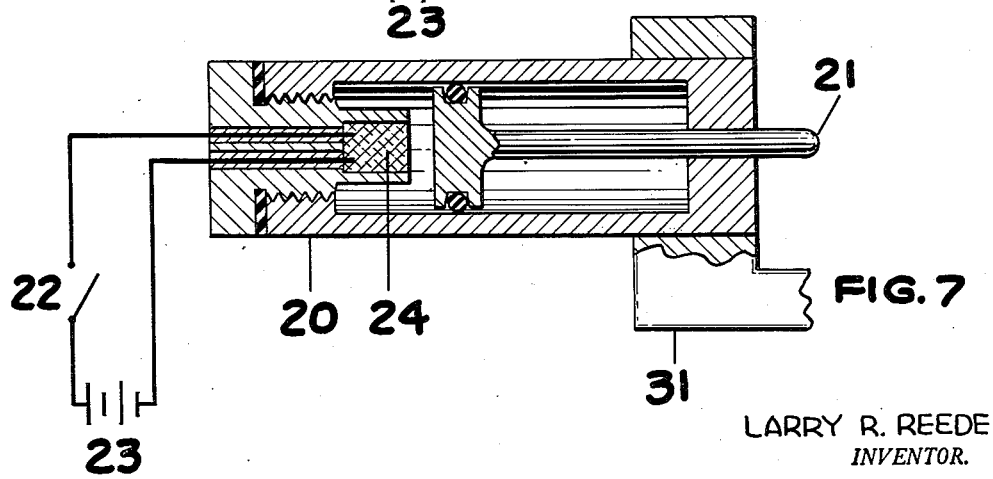

Accordingly, in FIGURE 5 there is shown a hydraulic or pneumatic cylinder 20 which cooperates with a plunger 21 in an obvious manner to open the valve means in response to longitudinal movement of the plunger 21. In FIGURE 6 there is shown another preferred embodiment wherein the plunger 21 is longitudinally moved by a conventional solenoid structure 20 in response to closing of the switch 22 of the source of electric power 23. FIGURE 7 shows an explosive operator wherein switch 22 is closed whereby the source of electric power actuates an explosive charge 24 to cause longitudinal movement of the plunger 21.

It is within the scope of the present invention for the actuating device 20 to be operated by remote independent means, such as from a control panel, or to be automatically operated in response to operation of another means such as another fire extinguisher.

In this preferred embodiment the shaft 15 is provided with a reduced diameter portion 15b and a hex nut 30 has been substituted for the acorn nut 27 to permit proper longitudinal movement of the shaft 15. It will be clear that the shaft 15 and the reduced diameter portion 15b may be considered major and minor dimensions of the shaft or major and minor diameter portions thereof.

The closed position of the valve means according to this embodiment is illustrated in FIGURE 3. When the actuating device 20 is operated the plunger 21 forces the shaft 15 axially or longitudinally so that the shaft 15, stem 12 and handwheel stem 17 take the relative positions indicated in FIGURE 3A.

Figure 4:
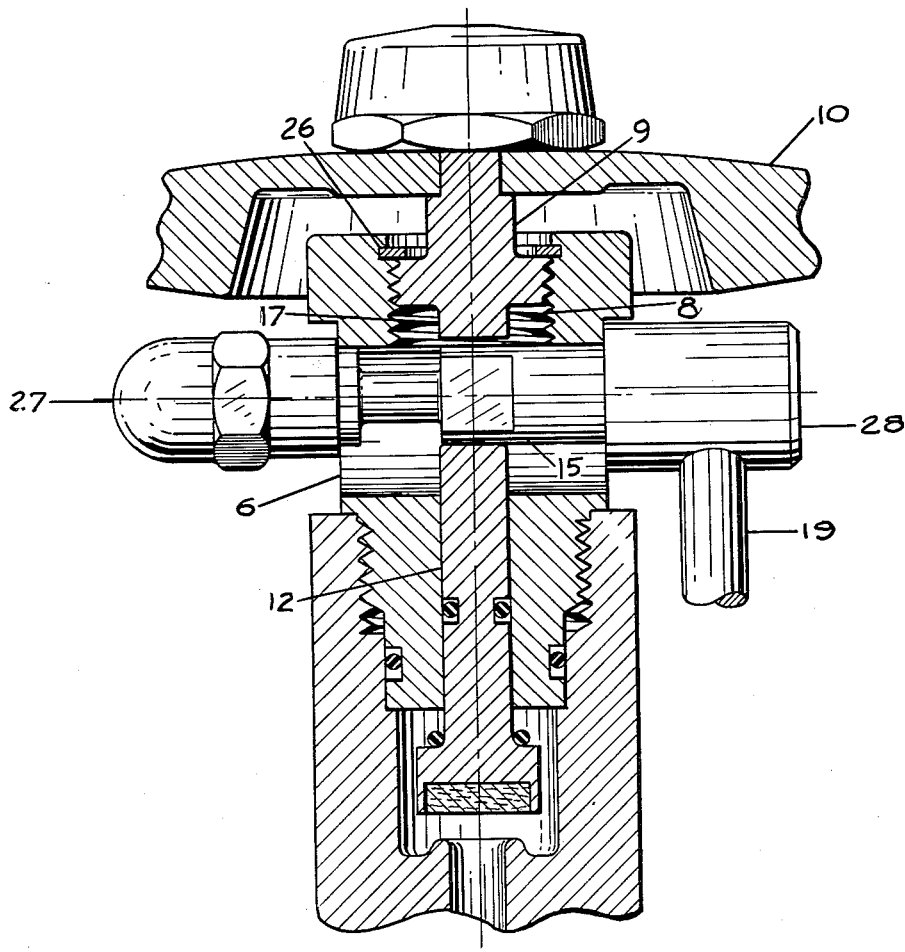
FIGURE 4 is another sectional view of the present invention showing the valve in its open position preparatory to closing the valve.

After the valve means has been opened by rotating shaft 15 as shown in FIGURE 2A or by displacing it laterally as shown in FIGURE 3A, the valve means may again be closed by rotating the handwheel stem to the position shown in FIGURE 4. At this time the valve means may be restored to its closed position by rotating shaft 15 or displacing laterally depending on which of the quick opening means was used to open the valve.

It is contemplated that useful embodiments of this invention may include any one or any combination of the novel valve operating means disclosed herein according to dictates of the particular problem at hand.

Accordingly, it is to be understood that the invention in its broader aspects is not limited to the specific elements shown and described, but also includes within the accompanying claims any departures made from such elements which do not sacrifice its chief advantages.

What is claimed is:

1. In an operator for a quick opening valve, a stem adapted for positioning a valve disk mounted at one end thereof, an operating shaft movably mounted adjacent the other end of said stem, said shaft having symmetrically positioned recesses and a reduced diameter portion adjacent thereto, the diameter of said shaft at said recesses and said reduced diameter portion being substantially equal, said shaft extending on both sides of the axis of said stem, and means for causing rotative or axial movement of said operating shaft whereby said valve disk can be quickly moved to an open position locally or remotely, when said stem engages one of said recesses or said reduced diameter portion.

2. A valve operator for use with a pressurized device comprising: a valve bonnet, a first stem threaded to said bonnet, a handwheel connected to said first stem and adapted to move said first stem, a second stem mounted in said bonnet and having a valve disk at one end thereof, an operating shaft mounted intermediate said first and second stems and engaging said first and second stems to hold said valve disk in a first position, said operating shaft including a reduced diameter portion adapted to be located adjacent said second stem in response to axial movement of said shaft, said shaft also including diametrically opposed flats adapted to be located adjacent said second stem in response to rotative movement of said shaft, said flats and said reduced diameter portion being adjacent and having a common surface, means for rotating said shaft at one end thereof, means for axially moving said shaft, said valve disk being movable to a second position after axial or rotative movement of said operating shaft locates one of said flats or said reduced diameter portion adjacent said second stem.

3. In an operator for a quick opening valve adapted to be opened by the pressure in a pressurized device comprising: a bonnet member having a bore and a recess therein, a first stem adjustably mounted in said bore, a handwheel connected to one end of said stem and adapted to impart adjusting movement thereto, a second stem in said bore connected to a valve disk, an operating shaft in said recess intermediate said first and second stems, said shaft including a reduced diameter portion and symmetrically positioned recesses adjacent said reduced diameter portion, said recesses having the same distance therebetween as the diameter of the reduced diameter portion, the second stem being maintained in a first position by contact of the first and second stems with the portion of shaft intermediate said recesses, said second stem moving to a second position to thereby permit opening of the valve when either the reduced diameter portion or one of said recesses is presented to said stems by axial or rotative movement of said shaft.

4. In an operator for a quick opening valve, a stem adapted for positioning a valve disk mounted at one end thereof, an operating shaft movably mounted adjacent the other end of said stem, said shaft having at least one recess and a reduced diameter portion adjacent thereto, the reduced diameter portion and said recess having a common surface, said shaft extending on both sides of the axis of said stem, means for rotating said shaft, and means for axially moving said shaft whereby said valve disk can be quickly moved to an open position in response to rotative or axial movement of the shaft.

References Cited in the file of this patent

UNITED STATES PATENTS

| | | |
|---|---|---|
| 902,096 | Love | Oct. 27, 1908 |
| 966,672 | Ellison | Aug. 9, 1910 |
| 1,888,948 | Hazard | Nov. 22, 1932 |
| 2,068,252 | Weber | Jan. 19, 1937 |
| 2,079,212 | Humblet | May 4, 1937 |
| 2,296,648 | McMahon | Sept. 22, 1942 |
| 2,658,717 | Acosta | Nov. 10, 1953 |
| 2,822,693 | Mulsow | Feb. 11, 1958 |
| 2,888,025 | Greenwood | May 26, 1959 |

FOREIGN PATENTS

| | | |
|---|---|---|
| 153,775 | Germany | Aug. 8, 1904 |
| 533,572 | Great Britain | Feb. 17, 1941 |
| 484,390 | Italy | Sept. 8, 1953 |
| 502,660 | Italy | Dec. 1, 1954 |